(12) United States Patent
Koyama

(10) Patent No.: US 8,363,415 B2
(45) Date of Patent: Jan. 29, 2013

(54) DETACHABLE NETWORK COMMUNICATION DEVICE, ELECTRONIC DEVICE AND COMMUNICATION DEVICE

(75) Inventor: Tadashi Koyama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 468 days.

(21) Appl. No.: 12/644,899

(22) Filed: Dec. 22, 2009

(65) Prior Publication Data
US 2010/0165584 A1 Jul. 1, 2010

(30) Foreign Application Priority Data

Dec. 25, 2008 (JP) .................................. 2008-331593
Dec. 7, 2009 (JP) .................................. 2009-277169

(51) Int. Cl.
*H05K 1/00* (2006.01)
(52) U.S. Cl. ...................................................... 361/748
(58) Field of Classification Search .................. 361/748, 361/679.4, 679.41, 720, 729, 754
See application file for complete search history.

(56) References Cited

U.S. PATENT DOCUMENTS

| 5,111,363 A * | 5/1992 | Yagi et al. ...................... 361/751 |
| 2008/0316120 A1* | 12/2008 | Hirota et al. ................... 343/702 |
| 2009/0224990 A1* | 9/2009 | Cezanne et al. ............... 343/726 |
| 2010/0035564 A1* | 2/2010 | Lee ............................... 455/90.3 |

FOREIGN PATENT DOCUMENTS

JP 2004-147144 5/2004

* cited by examiner

*Primary Examiner* — Jeremy Norris
*Assistant Examiner* — Tremesha S Willis
(74) *Attorney, Agent, or Firm* — Duane Morris LLP

(57) ABSTRACT

A detachable network communication device comprising a first antenna is disclosed. The detachable network communication device is operable to be coupled to a second electronic device comprising a second antenna, wherein the first antenna is coupled to the second antenna to form a combined antenna structure. The combined antenna structure is operable to receive and/or transmit radio signals such as, for example, digital television signals. The detachable network communication device may also comprise an additional sub-antenna that may be operable as a diversity antenna.

6 Claims, 6 Drawing Sheets

DETACHABLE NETWORK COMMUNICATION DEVICE, ELECTRONIC DEVICE AND COMMUNICATION DEVICE

CROSS-REFERENCE TO RELATED APPLICATION

The present application claims priority under 35 U.S.C. §119 to Japanese Application No. 2008-331593, filed on Dec. 25, 2008, entitled "DETACHABLE TERMINAL, ELECTRONIC DEVICE AND COMMUNICATION APPARATUS" and Japanese Patent Application No. 2009-277169, filed on Dec. 7, 2009, entitled "DETACHABLE TERMINAL, ELECTRONIC DEVICE AND COMMUNICATION APPARATUS". The content of which is incorporated by reference herein in its entirety.

FIELD

Embodiments of the present invention relate generally to detachable network communication devices, and more particularly relate to a detachable network communication device capable of wirelessly communicating with another electronic device.

BACKGROUND

Electronic detachable devices such as PC cards have various defined card sizes and number of pins, and a PC card inserted into a card slot of a personal computer (PC) may serve as an external communication device when used. For example, an Express Card may comply with a standard for an expansion card for a laptop computer formulated by the Personal Computer Memory Card International Association (PCMCIA). Such a PCMCIA Express Card can be defined such that a connector portion of the PCMCIA Express Card has 26 pins, a length of 75 mm, and a width of 34 mm. Some PC cards may have an antenna to perform wireless communication.

The size of the PC card may limit the size and other properties of the antenna, or conversely the size and other properties of the antenna may require the PC card to be large. Therefore, there is a need for PC card designs that are small and thin to improve portability and storage.

SUMMARY

A detachable network communication device comprising a first antenna is disclosed. The detachable network communication device is operable to be coupled to an electronic device comprising a second antenna. The first antenna is coupled to the second antenna to form a combined antenna structure. The combined antenna structure is operable to receive and/or transmit radio signals such as, for example, digital television signals. The detachable network communication device may also comprise an additional sub-antenna that may be operable as a diversity antenna.

An embodiment comprises a detachable network communication device. The detachable network communication device comprises a housing and a connector. The housing comprises a circuit module and a conductive part. The circuit module comprises a ground unit, a feeding unit, and a signal processing unit electrically coupled to the ground unit and the feeding unit. The conductive part is electrically coupled to one of the ground unit and the feeding unit. The first connector is operable to detachably couple to an external electronic device, and coupled to one of the ground unit and the feeding unit which is not coupled to the conductive part.

An embodiment comprises an electronic device. The electronic device comprises a docking port operable to detachably dock a detachable device. The electronic device further comprises a connector operable to couple to the detachable device docked in the docking port. The electronic device further comprises a conductive part coupled to the connector. The conductive part has a configuration and an area corresponding to a configuration and an area of the docking port.

An embodiment comprises an electronic system. The electronic system comprises detachable network communication device means comprising a first connector and a first conductive part. The electronic system further comprises electronic device means comprising a second connector formed on a circuit board and detachably coupled to the detachable network communication device and a second conductive part formed on the circuit board. The second conductive part is coupled to the detachable network communication device means. The first conductive part and the second conductive part comprise a combined antenna.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the present invention. The figures are provided to facilitate understanding of the embodiments without limiting the breadth, scope, scale, or applicability of the present invention. The drawings are not necessarily made to scale.

DETAILED DESCRIPTION

The following detailed description is exemplary in nature and is not intended to limit the present invention or the application and uses of the embodiments of the present invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the present invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the present invention are described herein in the context of practical non-limiting applications, namely, a mobile electric device such as a portable computer. Embodiments of the present invention, however, are not limited to such portable computers, and the techniques described herein may also be utilized in other electric devices. For example, embodiments may be applicable to a mobile phone, a Personal Digital Assistant (PDA), a GPS system, a desktop computer, a computer for industrial use and the like.

As would be apparent to one of ordinary skill in the art after reading this description, these are merely examples and the embodiments of the present invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the present invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims. Furthermore, there is no intention to be bound by any expressed or implied theory presented in the preceding technical field, background, brief summary or the following detailed description. The present invention should be accorded scope consistent with the claims, and not limited to the examples described and shown herein.

Figure 1:
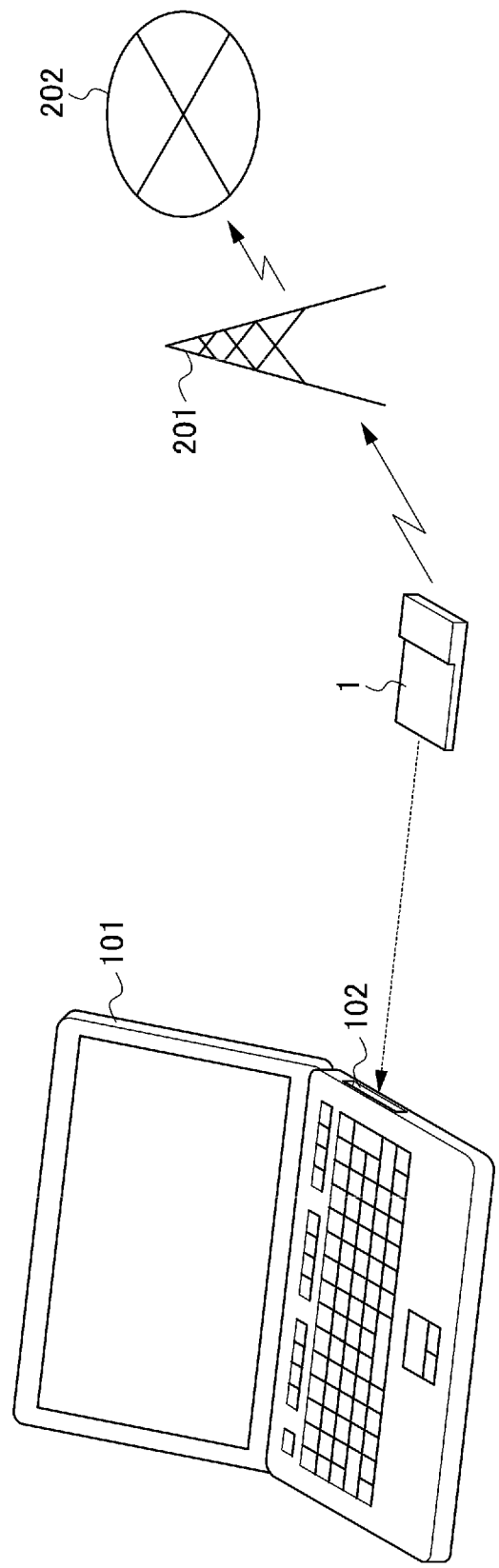
FIG. 1 illustrates a detachable network communication device connectable to a PC and a network according to an embodiment of the present invention.

FIG. 1 illustrates a detachable network communication device 1 (detachable device 1) connectable to a PC 101 and a network 202 according an embodiment of the present invention. The detachable device 1 is used as a PC card. The detachable device 1 may comprise an antenna (not shown in FIG. 1) for wireless communication. For example, as shown in FIG. 1, the detachable device 1 is detachably coupled to a card slot 102 of the PC 101 complying with a predetermined communication standard, such as but without limitation, an Express Card, and the like. When the detachable device 1 is detachably coupled to the card slot 102, the PC 101 is communicatively coupled to the network 202 via, for example, a base station 201. The network 202 may comprise, for example but without limitation, the Internet and the like.

Figure 2:
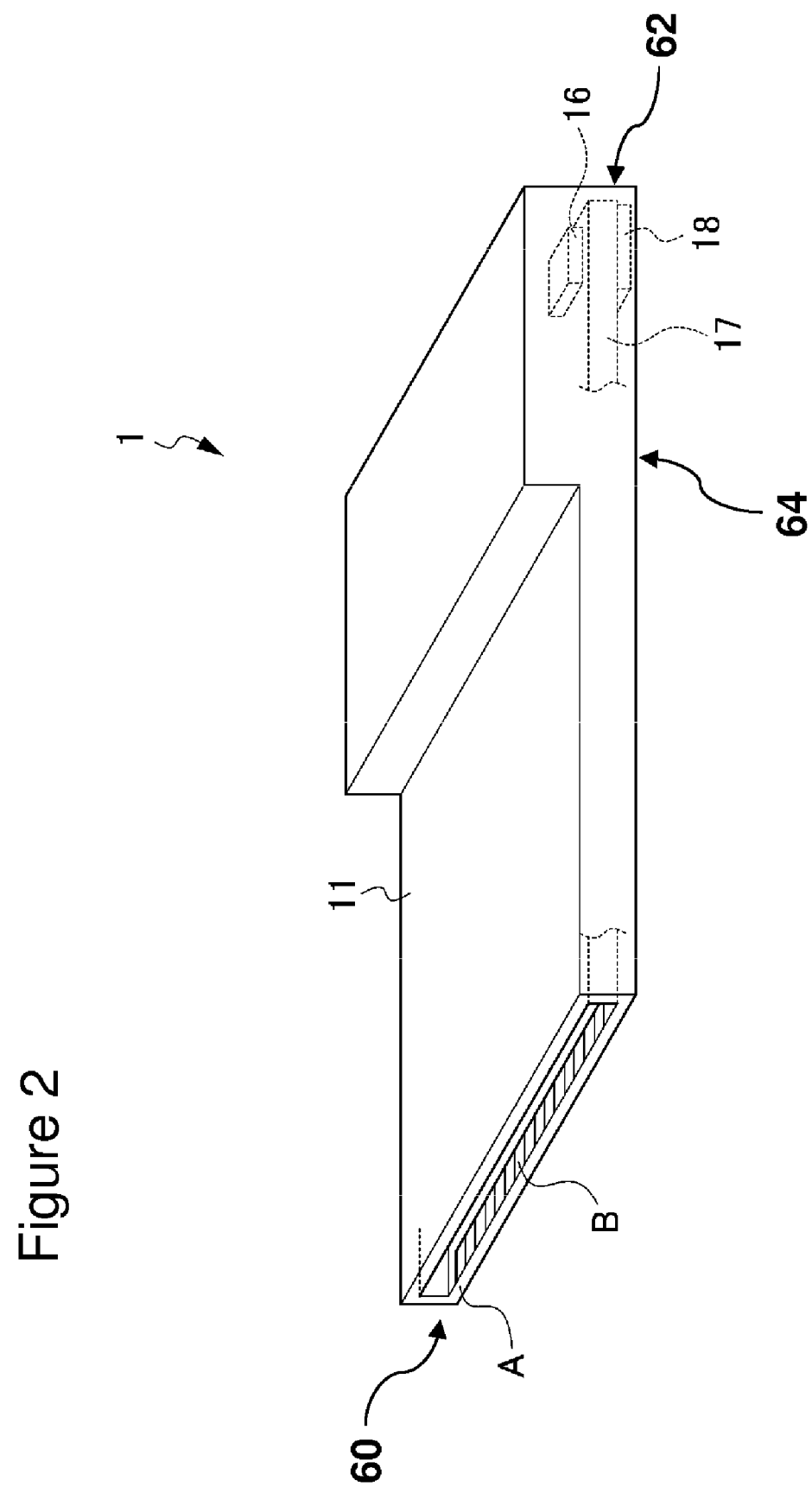
FIG. 2 is an illustration of a schematic perspective view of a detachable network communication device according to an embodiment of the present invention.

FIG. 2 is an illustration of a schematic perspective view of the detachable device 1 according to an embodiment of the present invention. The detachable device 1 comprises a connection body 11 (housing), a circuit board 17, and a parasitic element 18. The connection body 11 comprises an opening part A in a first end side 60. The connection body 11 further comprises an interface B complying with an industry standard at the opening part A. When the detachable device 1 is inserted to the card slot 102 of the PC 101, the interface B is electrically coupled to an interface (not shown) in the card slot 102. In this manner, data communication can be performed.

As will be described below in the context of discussion of FIG. 4, the detachable device 1 and the PC 101, comprise a conductive pattern 20 and a conductive pattern 54 respectively which serves as a combined antenna having a resonant frequency and operable to receive a high-frequency signal. The high-frequency signal may be received, for example but without limitation, from a digital terrestrial television broadcasting station, and the like.

The circuit board 17 may be located in the connection body 11 and may comprise a sub-antenna 16 (antenna element) having a second resonant frequency on a surface thereof. The sub-antenna 16 is located on a surface of the circuit board 17 near a second end side 62 of the connection body 11 opposite the first end side 60 where the opening part A is located. The parasitic element 18 may be located on a back side 64 of the circuit board 17 so as to face the sub-antenna 16. Alternatively, the parasitic element 18 may be located inside the connection body 11 on the back side 64 of the circuit board 17, or on an outside surface of the connection body 11 on the back side 64 of the circuit board 17.

According to an embodiment, similar to the conductive pattern 20 or the conductive pattern 54, the sub-antenna 16 has the first resonant frequency and is operable to receive a high-frequency signal. As mentioned above, the high-frequency signal may be received, for example but without limitation, from a digital terrestrial television broadcasting station, and the like. However, the sub-antenna 16 may also have more than one resonant frequency such a second resonant frequency and/or a third resonant frequency. The second resonant frequency may be, for example but without limitation, a frequency used in communication with systems utilizing code division multiple access (CDMA) industry standards, and the like. The third resonant frequency may be, for example but without limitation, a frequency used in location finding by global positioning system (GPS), and the like.

Figure 3:
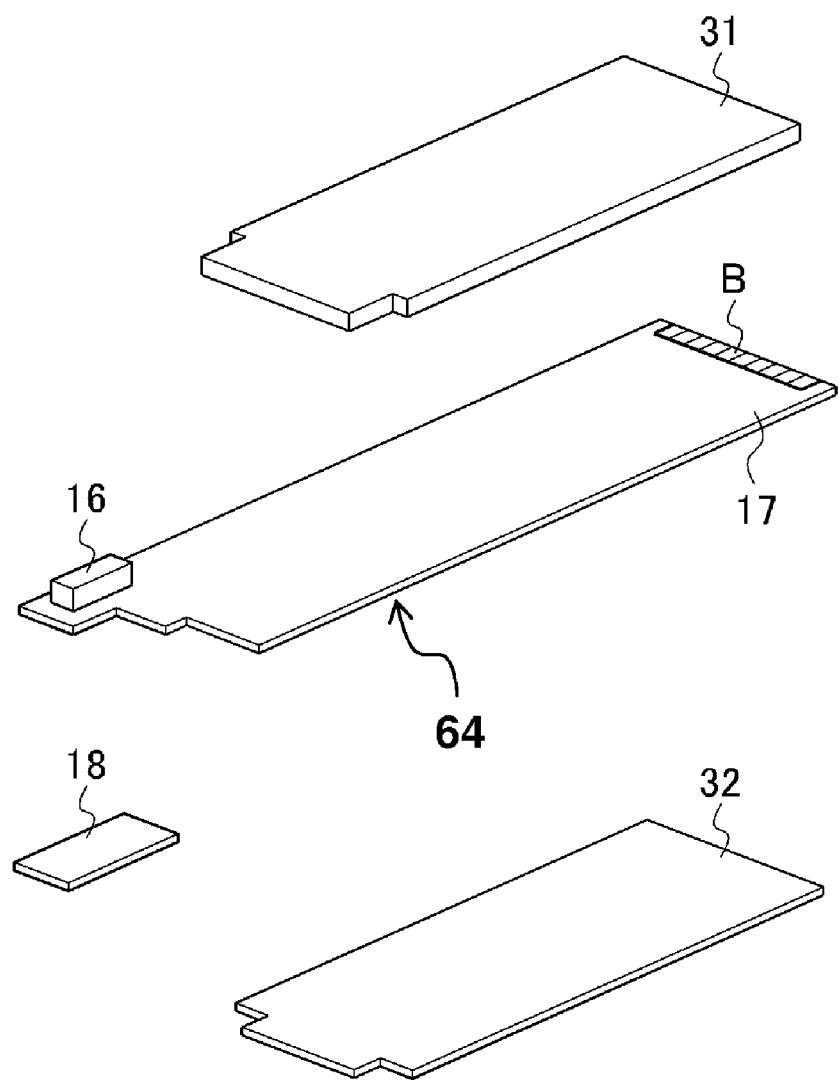
FIG. 3 is an illustration of an exploded perspective view of a detachable network communication device according to an embodiment of the present invention.

FIG. 3 is an illustration of an exploded perspective view of a detachable network communication device 1 (detachable device 1) according to an embodiment of the present invention. The detachable device 1 is simplified in FIG. 3 to show the structure thereof. As shown in FIG. 3, the circuit board 17 is located between plates 31 and 32.

Figure 4:
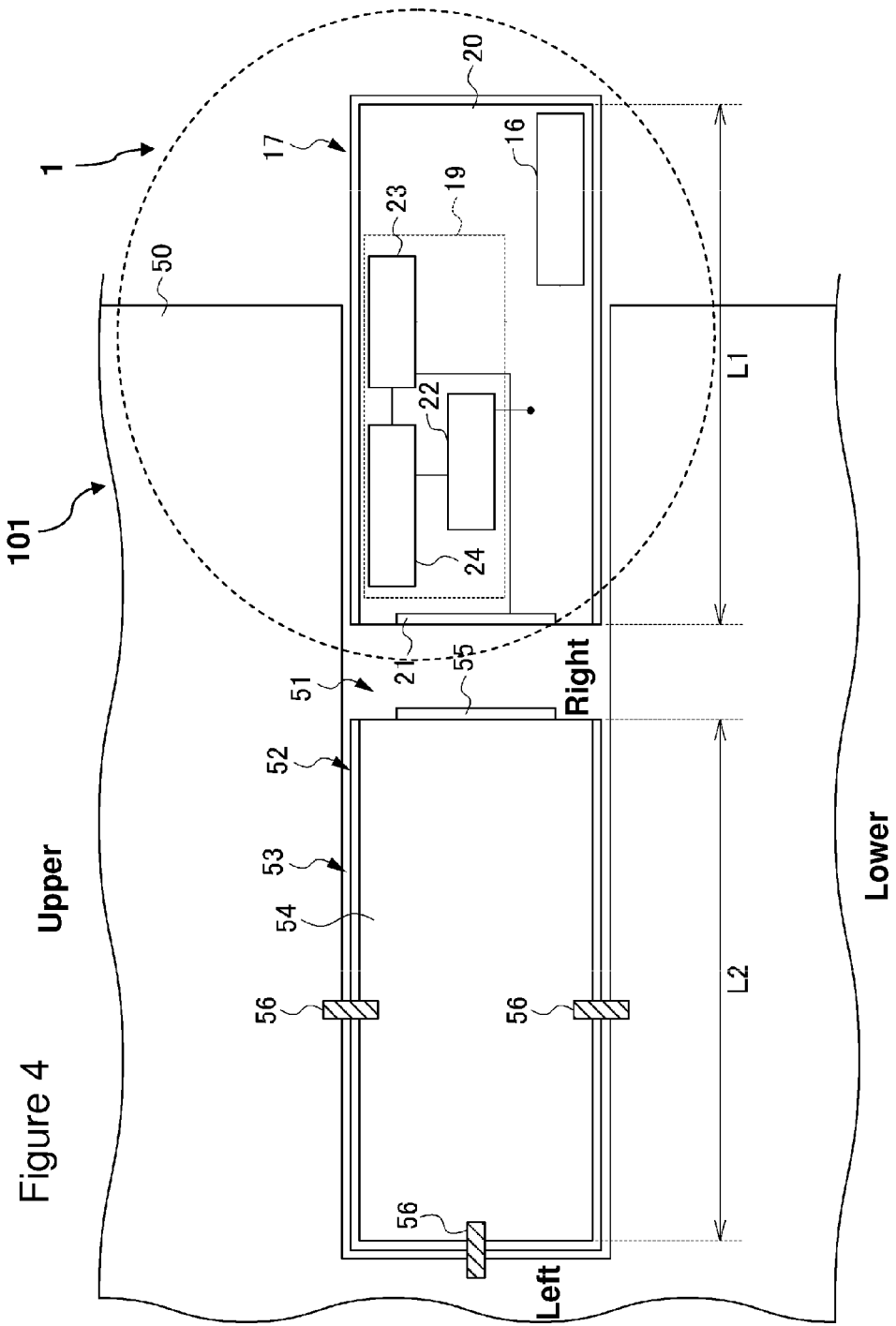
FIG. 4 is an illustration of a schematic configuration of a PC and a detachable network communication device attached to the PC according to an embodiment of the present invention.

FIG. 4 is an illustration of a schematic configuration of a PC 101 and a detachable device 1 attached to the PC 101 according to an embodiment of the present invention. The detachable device 1 comprises the connection body 11, (FIG. 2), the sub-antenna 16, the circuit board 17, a circuit module 19, the conductive pattern 20 (first conductive part), and a connector 21.

The circuit board 17 comprises the conductive pattern 20 thereon. Various kinds of electronic parts such as a CPU may be mounted on the circuit board 17. The circuit board 17 comprises the module 19 thereon.

The circuit module 19 comprises a ground unit 22, a feeding unit 23 and an RF circuit module 24 (i.e., signal processing unit).

The connector 21 is coupled to a connector 55 of the PC 101 to perform data communication with the PC 101. The connector 21 is electrically coupled to the feeding unit 23.

The ground unit 22 is electrically coupled to a reference potential and to the conductive pattern 20.

The feeding unit 23 is electrically coupled to the sub-antenna 16, the connector 21, and the RF circuit module 24. The sub-antenna 16 may be used as a diversity antenna.

The RF circuit module 24 is operable to process the high-frequency signal. In addition, the RF circuit module 24 is electrically coupled to the ground unit 22 and the feeding unit 23.

The PC 101 comprises a housing (not shown) and a circuit board 50. The circuit board 50 is located in the housing and comprises various kinds of electronic parts mounted thereon to operate the PC 101.

The housing comprises the card slot 102 (FIG. 1). The housing may further comprise a docking part 51 therein to dock the detachable device 1 inserted from the card slot 102. The docking part 51 has a configuration and an area such that a part of the detachable device 1 is exposed to the outside of the PC 101 when the detachable device 1 is docked.

The PC 101 also comprises a high-frequency substrate part 52 separated from the circuit board 50 by a slit 53. The high-frequency substrate part 52 may be, for example but without limitation, a part of a common circuit board or substrate with the circuit board 50, a separate circuit board or substrate from the circuit board 50, and the like. The high-frequency substrate part 52 comprises a space (not shown) for docking the detachable device 1 which is operable to be inserted in the card slot 102. In addition, the high-frequency substrate part 52 comprises the conductive pattern 54 (second conductive part) and the connector 55 thereon. The conductive pattern 54 is electrically coupled to the connector 55. The conductive pattern 54 is also electrically coupled to the circuit board 50 through a high frequency blocking part 56. The high-frequency substrate part 52 is located so as to face the detachable device 1 when the detachable device 1 is held in the card slot 102.

The slit 53 separates the high-frequency substrate part 52 by a predetermined distance from the circuit board 50. The slit 53 surrounds the high-frequency substrate part 52. Other isolative techniques may be used instead of the slit 53 such as, without limitation, an isolative trench on a common circuit board, and the like.

The conductive pattern 54 has a configuration and an area which corresponds to an external configuration and an external area of the docking part 51.

The connector 55 is operable to be coupled to the detachable device 1 docked in the docking part 51. In addition, the connector 55 is coupled to the connector 21 of the detachable device 1 to perform data communication with the detachable device 1.

The high frequency blocking part 56 is an electronic part mounted on the circuit board 50, and comprises an element which can block the high-frequency signal. Thus, the circuit board 50 performs signal communication with the high-frequency substrate part 52 through the high frequency blocking part 56. As shown on FIG. 4, the high frequency blocking part 56 of the PC 101 can be located on each of a left part, an upper surface part, and a lower surface part thereof. In this manner, locations and number of the high frequency blocking parts 56 are not limited to the embodiment shown in FIG. 4 and can vary to suit a desired operation of the PC 101 and the detachable device 1. Accordingly, the high frequency blocking part 56 may preferably not be located on a part of the high-frequency substrate part 52 facing the card slot 102 where the connector 55 is located. The high frequency blocking part 56 need not be an electronic part mounted on the high-frequency substrate part 52.

In operation, the detachable device 1 and the PC 101 receive the high-frequency signal when the detachable device 1 and the PC 101 are coupled as described below, that is, when the connector 21 and the connector 55 are coupled.

The conductive pattern 54 may receive the high-frequency signal, for example but without limitation, from the digital terrestrial television broadcasting station. The received signal is fed to the feeding unit 23 through the connector 55 and the connector 21. The feeding unit 23 transmits the fed signal to the RF circuit module 24.

The RF circuit module 24 receives the signal transmitted from the feeding unit 23 and performs signal processing on the received signal. Alternatively, the received signal may be processed in a predetermined way and transmitted to the feeding unit 23. In addition, the received signal is also received at the conductive pattern 20 functioning as the ground through the ground unit 22.

As described above, the conductive pattern 54 of the PC 101 and the conductive pattern 20 of the detachable device 1 are combined to comprise a combined antenna such as, but without limitation, a dipole antenna, and the like. The conductive pattern 54 serving as an antenna element and the conductive pattern 20 comprising the combined antenna and serving as a ground can appropriately receive the high-frequency signal from the digital terrestrial television broadcasting station. The conductive pattern 20 of the detachable device 1 is used as the first conductive part herein; however, the first conductive part may be, for example but without limitation, a metal housing of the connection body 11, a shield case arranged inside the connection body 11, a metal member arranged on the circuit board 17, and the like. The conductive pattern 54 of the PC 101 is used as the second conductive part herein; however, the second conductive part may be, for example but without limitation, a metal housing of the PC 101, a shield case arranged inside the PC 101, a metal member arranged on the circuit board 52, and the like.

In an embodiment, it is preferable that a longitudinal length L2 of the conductive pattern 54 is approximately equal to a longitudinal length L1 of the conductive pattern 20.

Since the conductive pattern 54 of the PC 101 and the conductive pattern 20 of the detachable device 1 comprise one antenna, such as the dipole antenna, it is not necessary to provide another antenna in the detachable device 1 and the PC 101, so that the number of the parts of the detachable device 1 can be reduced.

Further, since the detachable device 1 uses the conductive pattern 20 as the ground of the antenna, it is not necessary to provide a conductive unit serving as the ground in the detachable device 1 separately, so that the number of the parts can be further reduced.

Moreover, the circuit module 19 of the detachable device 1 may be formed on the circuit board 17 on which the conductive pattern 20 functioning as the ground of the antenna is formed. Therefore, it is not necessary to provide a circuit module in the detachable device 1 separately, so that the number of the parts can be further reduced.

As mentioned above, the sub-antenna 16 receives the high-frequency signal from the digital terrestrial television broadcasting station, having a first resonant frequency similar to the conductive pattern 20 or the conductive pattern 54 serving as the main antenna. The conductive pattern 20 is usually configured to be larger than the sub-antenna 16. In this manner, the high-frequency signal received from the digital terrestrial television broadcasting station in the conductive pattern 20 is prevented from concentrating on the vicinity of the sub-antenna 16. Therefore, interference between the main antenna and the sub-antenna 16 is prevented.

In addition, since the conductive pattern 20 is coupled to the ground unit 22, and the conductive pattern 54 is coupled to the feeding unit 23, the high-frequency signal from the digital terrestrial television broadcasting station is more likely to be transmitted to the conductive pattern 54 than the conductive pattern 20, so that the interference between the main antenna and the sub-antenna 16 can be further prevented.

Also, since the conductive pattern 54 of the PC 101 can function as a combined antenna together with the conductive pattern 20 of the detachable device 1, the PC 101 can be easily applied to the wireless communication.

The conductive pattern 54 is coupled to the circuit board 50 through the high frequency blocking part 56. Therefore, while low-frequency signals are is transmitted to the high-frequency substrate part 52 through the conductive pattern 54, high-frequency signals are prevented from being transmitted to the circuit board 50 from the high-frequency substrate part 52. Thus, the electronic parts mounted on the circuit board 50 can be protected from the high-frequency signal.

Since the high frequency blocking part 56 is the electronic part mounted on the circuit board 50, the electronic part mounted on the circuit board 50 can be effectively used.

The conductive pattern 54 serves as one part of the high-frequency substrate part 52. Therefore, since the one part of the high-frequency substrate part 52 can be used as the second conductive unit, the number of the parts in the PC 101 can be reduced.

Since the conductive pattern 20 provided in the detachable device 1 and the conductive pattern 54 provided in the PC 101 can function as the antenna with a simple structure, the number of the parts of the detachable device 1 and the PC 101 can be reduced.

Figure 5:
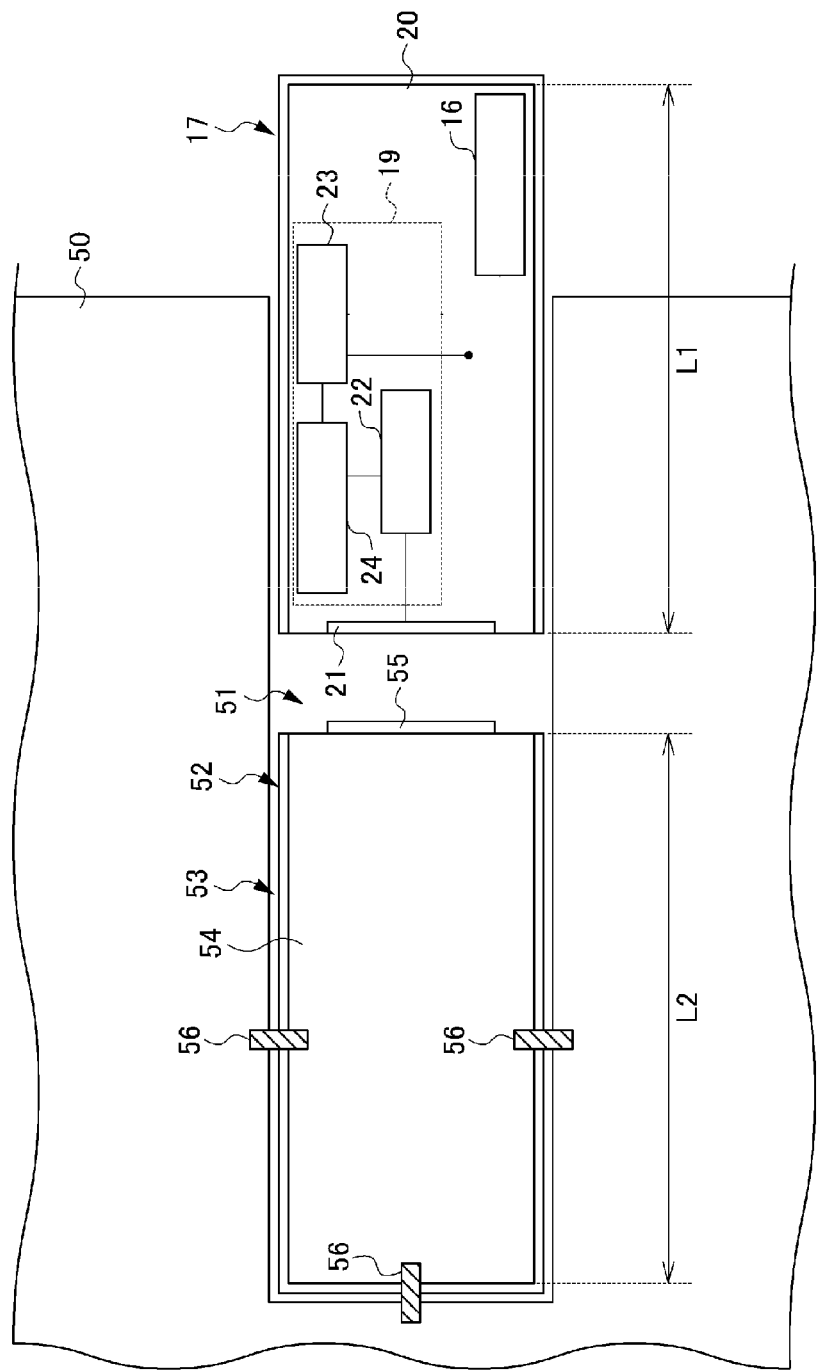
FIG. 5 is an illustration of a schematic configuration of a PC and a detachable network communication device attached to the PC according to an embodiment of the present invention.

FIG. 5 is an illustration of a schematic configuration of a PC 101 and a detachable device 1 attached to the PC 101 according an embodiment of the present invention. The embodiment shown in FIG. 4 has a structure that is similar to the embodiment shown in FIG. 5, common features, functions, and elements will not be redundantly described herein. The embodiment shown in FIG. 4 differs from the embodiment shown in FIG. 5 mainly in configurations of the ground unit 22 and the feeding unit 23.

The ground unit 22 is electrically coupled to the conductive pattern 20 and the connector 21. The feeding unit 23 is electrically coupled to the sub-antenna 16 and the RF circuit module 24.

In operation, the detachable device 1 and the PC 101 receive the high-frequency signal when the detachable device 1 and the PC 101 are coupled, that is, when the connector 21 and the connector 55 are coupled, as described below.

First, the conductive pattern 20 receives a high-frequency signal from an external device. The received signal is fed to the feeding unit 23. The feeding unit 23 transmits the fed signal to the RF circuit module 24.

Then, the RF circuit module 24 processes the signal transmitted from the feeding unit 23, or the signal may be processed in a predetermined way and transmitted to the feeding unit 23. In addition, the signal transmitted to the RF circuit module 24 is transmitted to the ground unit 22, the connector 21, the connector 55, and the conductive pattern 54 functioning as the ground.

Thus, the conductive pattern 20 of the detachable device 1 functions as an antenna element, and the conductive pattern 54 of the PC 101 functions as the ground. As a result, the conductive pattern 20 and the conductive pattern 54 comprise a combined antenna. In this manner, the conductive pattern 54 is formed on the high-frequency substrate part 52, and the conductive pattern 54 functions as the ground of the antenna. Therefore, since it is not necessary to provide a conductive unit functioning as the ground of the antenna in the detachable device 1, the number of the parts of the detachable device 1 can be reduced.

Also, since the conductive pattern 20 of the detachable device 1 can function as the antenna, it is not necessary to provide a conductive unit serving as the antenna separately, so that the number of the parts can be further reduced.

Moreover, the circuit module 19 of the detachable device 1 may be formed on the circuit board 17 on which the conductive pattern 20 functioning as the antenna is formed. Therefore, it is not necessary to provide a circuit module in the detachable device 1 separately, so that the number of the parts can be further reduced.

Figure 6:
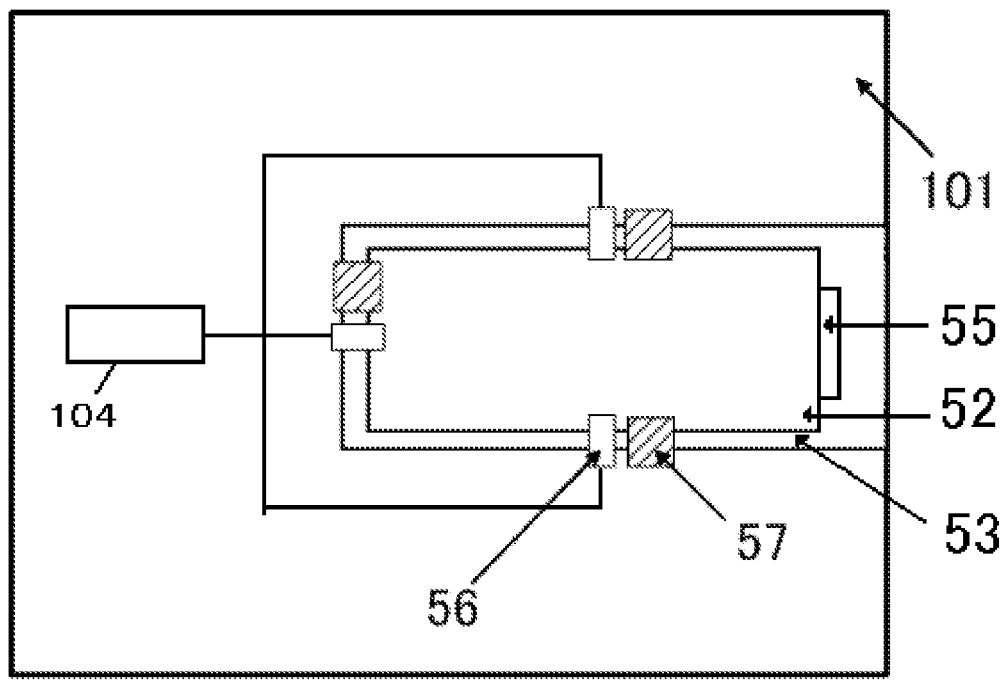
FIG. 6 is an illustration of a schematic configuration of a PC and a detachable network communication device attached to the PC according to an embodiment of the present invention.

FIG. 6 is an illustration of a schematic configuration of a PC and a detachable network communication device attached to the PC according to an embodiment of the present invention.

As shown in FIG. 6, the substrate part 52 and the circuit substrate 50 separated from the substrate part 52 may be coupled by a switch 57 in addition to the high frequency blocking part 56 or instead of the high frequency blocking part 56.

The switch 57 comprises, for example, an electronic component such as a switch IC or a mechanical switch, and configured to select between the conduction state and the non-conduction state of the substrate part 52 and the circuit substrate 50 separated from the substrate part 52 by the slit 53.

Thus, a control part 104 provided in the PC 101 observes the connection state of the connector 55, and when the connector 21 of the communication processing device 1 is coupled to the connector 55, the switch 57 is controlled to select the non-connection state between the substrate part 52 and the circuit substrate 50 separated from the substrate part 52 by the slit 53, and when the connector 21 of the communication processing device 1 is not coupled to the connector 55, the switch 57 is controlled to select the connection state between the substrate part 52 and the circuit substrate 50 separated from the substrate part 52 by the slit 53.

As a result, when the connector 21 of the communication processing device 1 is coupled to the connector 55, the conductive pattern 54 and the conductive pattern 20 are combined to comprise a combined antenna and can appropriately receive the high-frequency signal from the digital terrestrial television broadcasting station. When the connector 21 of the communication processing device 1 is not coupled to the connector 55, the area of the circuit substrate 50 is enlarged because the area of the substrate part 52 is added, so that static electricity is allowed to escape to the ground of the circuit substrate 50 instead of entering the PC 101 through the card slot 102.

Similarly, when the connector 21 of the communication processing device 1 is not coupled to the connector 55, the area of the circuit substrate 50 is enlarged because the area of the substrate part 52 is added, so that a noise caused by the electric component mounted on the circuit substrate 50 can be expected to be appropriately reduced.

The present invention is not limited to the above-mentioned embodiments and is applicable to other embodiments. For example, instead of using the conductive pattern 20 as the first conductive part, a metal case of the connection body 11, a shield case in the connection body 11, metal members on the circuit board 17 or the high-frequency substrate part 52, and the like can serve as the first conductive part. In addition, the slit 53 may be omitted.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the present invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An electronic system comprising:
   a detachable device comprising:
      a first connector; and
      a first conductive part; and
   an electronic device comprising:
      a second connector formed on a circuit board and detachably coupled to the detachable device; and
      a second conductive part formed on the circuit board and coupled to the detachable device, wherein the first conductive part and the second conductive part comprise a combined antenna, and wherein the electronic device further comprises a housing and an opening formed on a surface of the housing, and the detachable device is configured to be inserted into the housing via the opening.

2. The electronic system according to claim 1, wherein: the first conductive part comprises a first conductive pattern; and the second conductive part comprises a second conductive pattern.

3. The electronic system according to claim 2, wherein the detachable device uses the first conductive pattern of the detachable device as a ground of the combined antenna.

4. The electronic system according to claim 3, wherein a circuit module of the detachable device is formed on the circuit hoard on which the first conductive pattern of the detachable device functions as the ground of the combined antenna.

5. The electronic system according to claim 2, wherein the first conductive pattern of the detachable device is larger than a sub-antenna of the detachable device to prevent interference between the combined antenna and the sub-antenna.

6. The electronic system according to claim 1, wherein the combined antenna comprises a dipole antenna.

* * * * *